United States Patent
Hui et al.

(10) Patent No.: US 8,379,709 B2
(45) Date of Patent: Feb. 19, 2013

(54) CHANNEL ESTIMATION AND EQUALIZATION FOR HARD-LIMITED SIGNALS

(75) Inventors: Dennis Hui, Cary, NC (US); Kambiz Zangi, Chapel Hill, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1112 days.

(21) Appl. No.: 12/204,217

(22) Filed: Sep. 4, 2008

(65) Prior Publication Data

US 2010/0054322 A1    Mar. 4, 2010

(51) Int. Cl.
*H04L 27/01*    (2006.01)
(52) U.S. Cl. ............... 375/232; 375/346; 375/316
(58) Field of Classification Search ............ 375/232, 375/346, 316
See application file for complete search history.

(56) References Cited

U.S. PATENT DOCUMENTS

| | | | |
|---|---|---|---|
| 5,809,083 A * | 9/1998 | Wright | 375/285 |
| 2002/0131489 A1 * | 9/2002 | Allpress et al. | 375/233 |
| 2005/0002445 A1 * | 1/2005 | Dunyak et al. | 375/148 |

* cited by examiner

*Primary Examiner* — Shuwang Liu
*Assistant Examiner* — Michael Neff

(57) ABSTRACT

The present invention provides a method and apparatus for channel estimation when the amplitude of a received signal is hard-limited. A channel estimator computes amplitude estimates for the received signal based on the phase samples of the received signal and previous channel estimates. The amplitude estimates may comprise the expected values of the amplitude given the phase samples and the initial channel estimates. The channel estimator then computes revised channel estimates based on the amplitude estimates and the phase samples. The process may be performed iteratively to refine the channel estimates during each iteration.

29 Claims, 5 Drawing Sheets

CHANNEL ESTIMATION AND EQUALIZATION FOR HARD-LIMITED SIGNALS

TECHNICAL FIELD

The present invention relates generally to a method and apparatus for equalizing a received signal transmitted over a wireless communication link and, more particularly, to a method and apparatus for generating channel estimates from the phase information for a received signal in a receiver with a hard-limiting front end.

BACKGROUND

Many high-performance wireless receivers in cellular communication systems have a linear receiver front-end that is capable of providing both amplitude and phase information for the received signal to the baseband signal processing unit. For this kind of receiver, an automatic gain control (AGC) unit is often needed to bring the fading signal into the linear operating range of the receiver. The requirement of AGC increases not only the design effort, but also the overall cost and power consumption of the receiver.

Hard (amplitude) limiting receivers are known to be small in size, low in cost, and energy efficient. For such receivers, no AGC is required since the dynamic range of the signal amplitude is limited in the front-end. Consequently, hardware cost, and power consumption can be significantly reduced compared to the linear receivers. Hard-limiting receiver front ends are particularly suitable for applications of wireless technology, such as distributed sensor networks, Bluetooth, and Ultra-Wideband (UWB) systems, where lightweight, low cost, and low power consumption are extremely important for the wireless nodes. However, because hard-limiting receivers can provide only reliable phase information for the received signal to the baseband signal processor, hard-limiting receivers are often significantly outperformed by linear receivers. One of the main factors for their inferior performance is the lack of an accurate channel estimate, which is difficult to derive from only the phase information in the received signal.

SUMMARY

The present invention relates to a method and apparatus for generating accurate channel estimates from the phase samples of a received signal where the received signal has been hard-limited. According to one exemplary embodiment, a channel estimator computes amplitude estimates for the received signal based on the phase samples of the received signal and previous channel estimates. The amplitude estimates may comprise the expected values of the amplitude given the phase samples and the previous channel estimates. The channel estimator then computes revised channel estimates based on the amplitude estimates and the phase samples.

One exemplary embodiment comprises a method and apparatus for computing the amplitude estimates iteratively from the phase samples of the received signal. During each iteration, a channel estimator computes amplitude estimates from the received phase samples and previous channel estimates. The amplitude estimates are then combined with the phase samples to reconstruct an estimate of the received signal, which is used to compute revised estimates of the channel. The iterative process is repeated until a predetermined stop criterion is met and the channel estimate derived in the final iteration is output.

DETAILED DESCRIPTION

Figure 1:
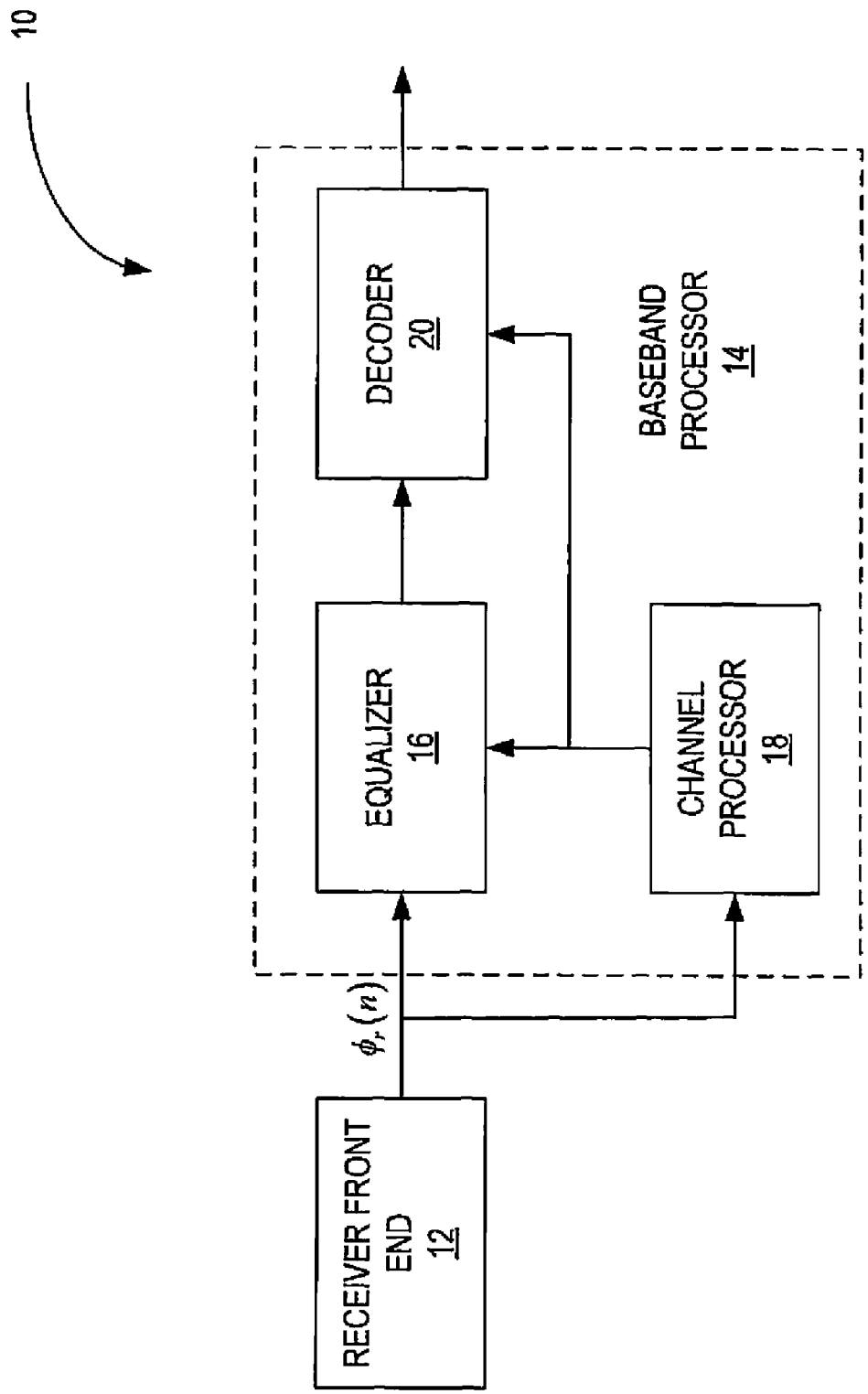
FIG. 1 illustrates an exemplary receiver according to one embodiment of the present invention.

Referring now to the drawings, FIG. 1 illustrates an exemplary wireless receiver 10 according to one embodiment of the invention. Wireless receiver 10 comprises a receiver front-end 12 and a baseband processor 14. Receiver front-end 12 amplifies, filters, downconverts, and digitizes received signals that contain transmitted information and the baseband processor 14 processes the digitized baseband signals to extract the transmitted information. In a preferred embodiment, the receiver front-end 12 comprises a hard-limiting front end that limits the amplitude of the received signal. Because the amplitude of the received signal is hard-limited, there is no need for automatic gain control (AGC) circuits in the receiver front end 12 to adjust the dynamic range of the receiver front end 12. The baseband processor 14 includes an equalizer 16 for equalizing the received signal and a channel processor 18 to generate channel estimates for the equalizer 16. Equalizer 16 may comprise, for example, a conventional maximum likelihood sequence estimation (MLSE) equalizer, as described by Sirikiat Ariyavisitakul, "Equalization of a hard-limited slowly-fading multipath signal using a phase equalizer with time-reversal structure," IEEE Journal on Selected Areas in Communications, vol. 10, pp. 589-598, April 1992. The MLSE equalizer 16 uses channel estimates provided by the channel processor 18 to generate an estimate of the transmitted symbols. The channel processor 18 generates estimates of the channel response from a known training sequence contained within the received signal. Because amplitude information is not available, the channel processor 18 must produce accurate channel estimates based on only on the phase information in the received signal. The baseband processor 14 may include other elements not relevant to the claimed invention, such as a decoder 20 following the equalizer to decode the transmitted symbols.

The received signal r(n) with no hard-limiting (i.e., both phase and amplitude components are available) may be modeled as:

$$\begin{aligned} r(n) &= a_r(n)e^{j\phi_r(n)} \\ &= \sum_{k=0}^{L-1} c(k)s(n-k) + w(n) \\ &= s(n)^T c + w(n), \end{aligned} \tag{1}$$

where $a_r(n)$ and $\phi_r(n)$ denote respectively the amplitude and phase of the signal r(n), $\{s(n)\}$ denotes the pilot sequence or training sequence, $\{c(k)\}_{k=0}^{L-1}$ denotes the time-domain channel response of length L, and $\{w(n)\}$ denotes the additive noise modeled as white complex Gaussian process with variance $E|w(n)|^2=\sigma^2$. For notational simplicity, let $c=(c(0), c(1), \ldots, c(L-1))^T$ and $s(n)=(s(n), s(n-1), \ldots, s(n-L+1))^T$.

With a hard-limiting front-end 12, the only available part of the received signal is a series of phase samples $\{\phi_r(n)\}$, from which the equalizer 14 must detect the transmitted sequence $\{s(n)\}$. The marginal log likelihood function given the transmitted symbols $s(n)$, the channel c, and the noise variance $\sigma^2$ is given by:

$$ll_{\phi_r(n)}(s(n), c, \sigma) \equiv \log p(\phi_r(n) | s(n), c, \sigma) \quad (2)$$
$$= \log \int_0^\infty a_r p(r(n) | s(n), c, \sigma)\Big|_{r(n)=a_r e^{j\phi_r(n)}} da_r,$$

where $$p(r(n) | s(n), c, \sigma) = \frac{1}{\pi\sigma^2} \exp\left\{-\frac{|r(n) - s(n)^T c|^2}{\sigma^2}\right\} \quad (3)$$

represents the marginal probability density function of $r(n)$ given $s(n)$, $c(n)$, and $\sigma^2$.

After some manipulations, it may be shown that:

$$ll_{\phi_r(n)}(s(n), c, \sigma) = \quad (4)$$
$$-\gamma(s(n), c, \sigma)^2 + \log(1 + \sqrt{\pi}\, \alpha(\phi_r(n), s(n), c, \sigma) e^{\alpha(\phi_r(n),s(n),c,\sigma)^2}$$
$$erfc(-\alpha(\phi_r(n), s(n), c, \sigma))) - \log(2\pi),$$

where $$erfc(x) \equiv \frac{2}{\sqrt{\pi}} \int_x^\infty e^{-y^2} dy, \quad (5)$$

and $$\gamma(s(n), c, \sigma) \equiv \frac{|e^{-j\phi_r(n)} s(n)^T c|}{\sigma} = \frac{|s(n)^T c|}{\sigma}, \quad (6)$$

and $$\alpha(\phi_r(n), s(n), c, \sigma) \equiv \frac{\text{Re}\{e^{-j\phi_r(n)} s(n)^T c\}}{\sigma} \quad (7)$$
$$= \gamma(s(n), c, \sigma)\cos(\phi_r(n) - \phi_{s^T c}(n)),$$

and $\phi_{s^T c}(n)$ denotes the phase of $s(n)^T c$. Note that the marginal log likelihood function depends on the phase $\phi_r(n)$ only through $\alpha$, and depends on the channel c and the noise variance $\sigma$ only through $\alpha$ and $\gamma$.

Because the noise $\{w(n)\}$ is assumed to be white, the received phase samples $\{\phi_r(n)\}$ are conditionally independent given the transmitted symbols $\{s(n)\}$ and the channel c. Therefore, the log likelihood function given the entire sequence $\{s(n)\}$, the channel c and the noise variance $\sigma^2$ is the sum of the marginal log likelihoods. Dropping the constant term, the desired branch metric for an MLSE phase equalizer 16 is obtained as:

$$dM_{Phase}(n,s(n)) = -\gamma(s(n),c,\sigma)^2 + \log(1 + \sqrt{\pi}\alpha(\phi_r(n),s(n),c,\sigma) e^{\alpha(\phi_r(n),s(n),c,\sigma)^2} erfc(-\alpha(\phi_r(n),s(n),c,\sigma))) \quad (8)$$

To compute this branch metric, estimates of the channel response c and the noise variance $\sigma^2$ are needed. To obtain the maximum-likelihood (ML) estimate of c and $\sigma$, the derivative of Eq. (4) may be set to zero and solved for c and $\sigma$. Unfortunately, there is no close form expression for the ML estimates of c and $\sigma$, which makes this approach impractical.

According to the present invention, an iterative Expectation-Maximization(EM) method is used to compute a ML estimate of the channel response based only on the phase information in the received signal $r(n)$. The EM method provides an intuitive method of estimating a desired parameter from incomplete observed data by iteratively estimating the missing data. In the present invention, the missing data is the amplitude information for the received signal $r(n)$. The EM method is used to iteratively estimate the amplitude (the missing data) of the received signal $r(n)$ based on the phase samples of the received signal and previous channel estimates. The amplitude estimates are then used to compute revised channel estimates in each iteration using conventional channel estimation techniques. Revised channel estimates are computed in each iteration by combining the computed amplitude estimates with the phase samples of the received signal to reconstruct an estimate $\hat{r}(n)$ of the received signal. The received signal estimate is then used to compute revised channel estimates using conventional channel estimation techniques. The revised channel estimate may be used as the previous channel estimate for the next iteration.

According to one embodiment of the present invention, the EM method is used to compute the joint estimate $(\hat{c}_{ML},\hat{\sigma}_{ML})$ of c and $\sigma$ that maximizes the log-likelihood function:

$$(\hat{c}_{ML}, \hat{\sigma}_{ML}) = \underset{(c,\sigma)}{\arg\max} \sum_{n=L-1}^{N-1} ll_{\phi_r(n)}(s_t(n), c, \sigma), \quad (9)$$

where $ll_{\phi_r(n)}(s_t(n),c,\sigma)$ denotes the marginal log-likelihood function given by Eq. (2). Eq. (9) is difficult to solve analytically. However, by treating the signal amplitudes $\{a_r(n)\}_{n=L-1}^{N-1}$ as missing observations and applying the EM method, it is possible to iteratively compute a series of joint estimates $\{(\hat{c}^n,\hat{\sigma}^n)\}$ that converge to $(\hat{c}_{ML},\hat{\sigma}_{ML})$. During the $n^{th}$ iteration, the joint estimate $(\hat{c}^n,\hat{\sigma}^n)$ is computed according to:

$$(\hat{c}^{(n-1)}, \hat{\sigma}^{(n+1)}) = \underset{(c,\sigma)}{\arg\max} E[\log p(a_r, \phi_r | c, \sigma) | \phi_r, \hat{c}^{(n)}, \hat{\sigma}^{(n)}], \quad (10)$$

where $$p(a_r, \phi_r | c, \sigma) = \prod_{n=L-1}^{N-1} p(a_r(n), \phi_r(n) | c, \sigma) \quad (11)$$
$$= \frac{\prod_{n=L-1}^{N-1} a_r(n)}{(\pi\sigma)^{N-L+1}} \exp\left\{-\frac{\|\Phi_r a_r - Sc\|^2}{\sigma^2}\right\},$$

and $$\Phi_r \equiv \begin{pmatrix} e^{j\phi_r(L-1)} & 0 & \cdots & 0 \\ 0 & e^{j\phi_r(L)} & 0 & \vdots \\ \vdots & 0 & \ddots & 0 \\ 0 & \cdots & 0 & e^{j\phi_r(N-1)} \end{pmatrix}, \quad (12)$$

and $S=(s_t(L-1),s_t(L), \ldots, s_t(N-1))^T$ denotes the convolution matrix of the training sequence.

The solution to Eq. (10) may be obtained by estimating the signal amplitude $\hat{a}^{(n+1)}$ over the training sequence based on the phase samples $\{\phi_r\}$ of the received signal and then computing revised channel estimates $\hat{c}^{(n+1)}$ and revised noise statistics $(\hat{\sigma}^{(n+1)})^2$.

During each iteration, the amplitude $\hat{a}^{(n+1)}$ is estimated by computing the expected value (or conditional mean) of the amplitude given the phase $\phi_r$ of the received signal, previous channel estimate $\hat{c}^{(n)}$, and previous noise statistics $\hat{\sigma}^{(n)}$ according to:

$$\hat{a}_r^{(n+1)} = E[a_r \mid \phi_r, \hat{c}^{(n)}, \hat{\sigma}^{(n)}] = \hat{\sigma}^{(n)} f\left(\frac{m^{(n)}}{\hat{\sigma}^{(n)}}\right), \quad (13)$$

where $m^{(n)} \equiv \text{Re}\{\Phi_r^H S \hat{c}^{(n)}\}$ and $$f(x) = x + \frac{1}{2\left(x + \frac{1}{\sqrt{\pi} \, e^{x^2} \text{erfc}(-x)}\right)}. \quad (14)$$

The previous channel estimate $\hat{c}^{(n)}$ is the channel estimate generated in a previous iteration. For the first iteration, $\hat{c}^{(n)}$ is initialized to some starting value, which may be chosen arbitrarily, or may be based on other available information. With the amplitude estimates $\hat{a}_r^{(n+1)}$, revised channel estimates $\hat{c}^{(n+1)}$ may than be computed using any known channel estimation technique. For example, least square channel estimates may be computed according to:

$$\hat{c}^{(n+1)} = (S^H S)^{-1} S^H \underbrace{[\Phi_r \hat{a}^{(n+1)}]}_{\hat{r}^{(n+1)}}. \quad (15)$$

Alternatively, the channel processor 18 may generate Maximum A Posteriori (MAP) channel estimates according to:

$$\hat{c}^{(n+1)} = (S^H S + (\hat{\sigma}^{(n)})^2 I)^{-1} S^H [\Phi_r \hat{a}^{(n+1)}]. \quad (16)$$

It may be noted that the product $\Phi_r \hat{a}^{(n+1)} = \hat{r}^{n+1}$ in Eqs. 15 and 16 is an estimate of the received signal reconstructed by combining the amplitude estimates with the phase samples of the received signal.

After computing revised channel estimates $\hat{c}^{(n+1)}$, the channel processor 18 may compute revised noise statistics $\hat{\sigma}^{(n+1)}$ according to:

$$\hat{\sigma}^{(n+1)} = \sqrt{\frac{1}{N-L+1} E[\|r - S\hat{c}^{(n+1)}\|^2 \mid \phi_r, \hat{c}^{(n)}, \hat{\sigma}^{(n)}]} \quad (17)$$

$$= \sqrt{\frac{1}{N-L+1}\left[\varepsilon^{(n+1)} + (\hat{\sigma}^{(n)})^2 \left\|h\left(\frac{m^{(n)}}{\hat{\sigma}^{(n)}}\right)\right\|^2\right]},$$

where $$h(x) \equiv \sqrt{\frac{1}{2} + \frac{1}{2(1+\sqrt{\pi}\, x e^{x^2} \text{erfc}(-x))} - \left[\frac{1}{2\left(x + \frac{1}{\sqrt{\pi}\, e^{x^2} \text{erfc}(-x)}\right)}\right]^2} \quad (18)$$

and $$\varepsilon^{(n+1)} = \|\hat{r}^{(n+1)} - \Phi_r \hat{a}^{(n+1)}\|^2 \quad (19)$$
$$= \|\Phi_r \hat{a}^{(n+1)} - S\hat{c}^{(n+1)}\|^2.$$

In the illustrated embodiments, the noise statistic comprises the noise standard deviation. However other noise statistics, for example the noise variance, may also be used.

Figure 2:
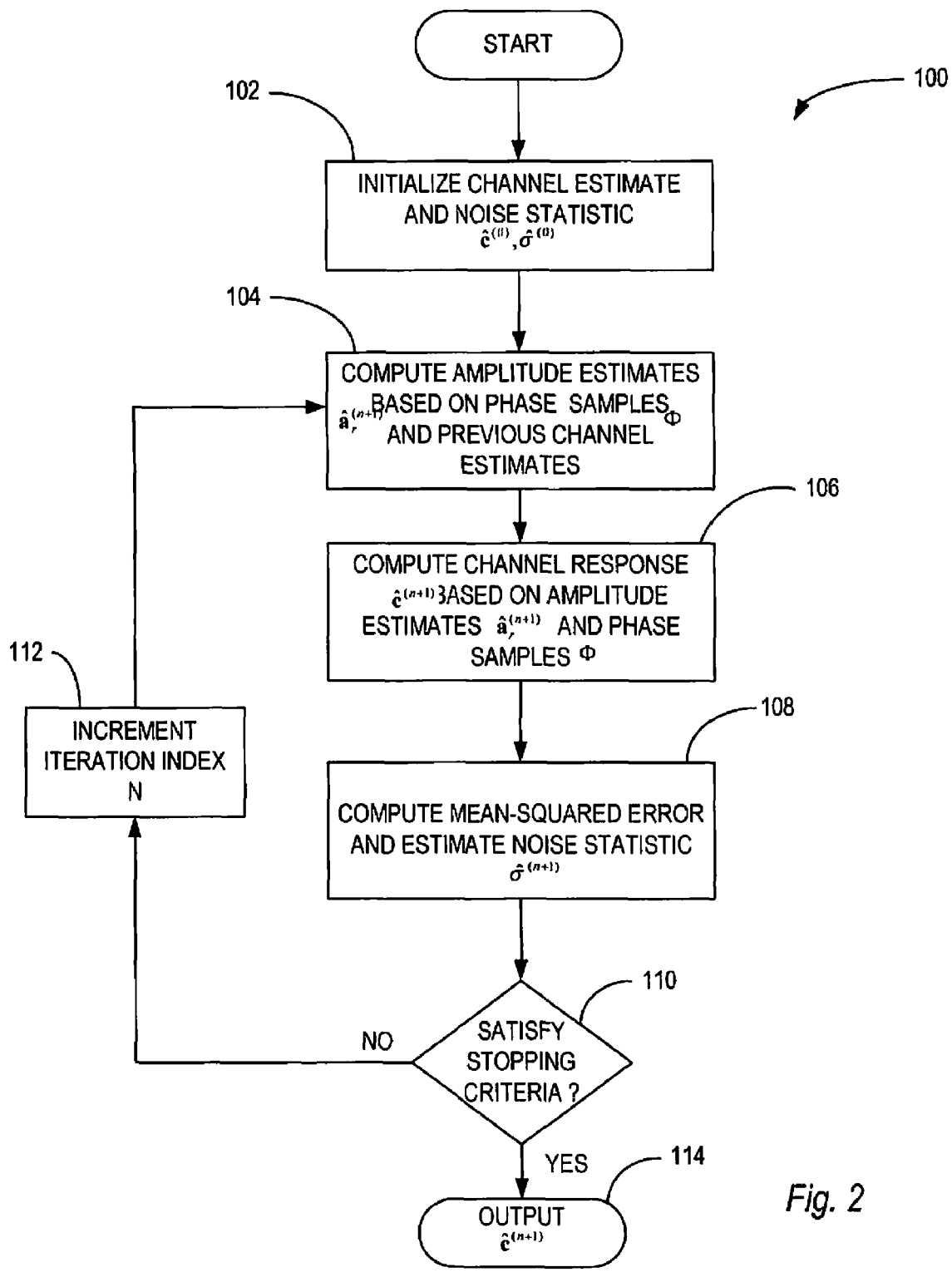
FIG. 2 illustrates an exemplary method for computing channel estimates according to a first embodiment.

FIG. 2 illustrates an exemplary method 100 implemented by the channel processor 18 for computing channel estimates $\hat{c}$ according to one embodiment of the present invention. The receiver front end 12 provides the received phase samples $\{\phi_r\}$ of the received signal over the training sequence to the channel processor 18. The channel processor 18 initializes the channel estimates $\hat{c}$ and noise statistics $\hat{\sigma}$ (block 102). The initial channel estimates and noise statistics are denoted respectively by $\hat{c}^{(0)}$ and $\hat{\sigma}^{(0)}$. The initial estimates may be set arbitrarily (e.g., $\hat{c}^{(0)} = [1,1]$ for L=2 and $\sigma=0.1$). Also, other information may be used if available. For example, the channel estimates and noise statistics from a previous period may be used as the initial estimates. In OFDM systems, channel estimates and noise statistics from a different subcarrier may be used if available to initialize the channel estimates for a selected subcarrier.

Following initialization of the channel estimates $\hat{c}$ and noise statistics $\hat{\sigma}$, the channel processor 18 iteratively computes the channel estimates $\hat{c}$ and noise statistics $\hat{\sigma}$ based on the phase samples $\{\phi_r\}$ of the received signal (blocks 104-108). During each iteration, the channel processor 18 computes amplitude estimates $\hat{a}$ for the received signal based on the phase samples $\{\phi_r\}$ and previous channel estimates $\hat{c}^{(n)}$ according to Eq. 13 (block 104). The initial channel estimates $\hat{c}^{(0)}$ serve as the previous channel estimates $\hat{c}^{(n)}$ in the first iteration. By combining the estimated signal amplitudes $\hat{a}$ with the phase samples $\{\phi_r\}$, the channel processor 18 is able, in effect, to reconstruct an estimate $\hat{r}(n)$ of the received signal before hard-limiting. The received signal estimate $\hat{r}(n)$ is then used in a conventional manner to generate revised channel estimates $\hat{c}$ (block 106). For example, least square channel estimates $\hat{c}_{LSE}$ may be computed according to Eq. (15), or MAP channel estimates $\hat{c}_{MAP}$ may be computed according to Eq. 16.

Once the revised channel estimates $\hat{c}$ are obtained, the channel processor 18 computes a revised noise statistic $\hat{\sigma}$ by computing the mean square error according to Eq. (19) and the noise standard deviation according to Eq. (17) (block 108). After computing the revised noise statistic $\hat{\sigma}$, the channel processor 18 determines whether to continue with another iteration based on some predetermined stop criteria (block 110). For example, the channel processor 18 may stop after a predetermined maximum number of iterations are reached. Alternatively, the channel processor 18 may stop when the incremental change in the sum of marginal log-likelihood functions is less than a predetermined threshold. If the stop criterion is met, the channel processor 18 outputs the most recent channel estimate generated during the last iteration and stops (block 114). If the stop criteria is not met, the channel processor 18 increments the index n (block 112) and repeats blocks 104-110.

Figure 3:
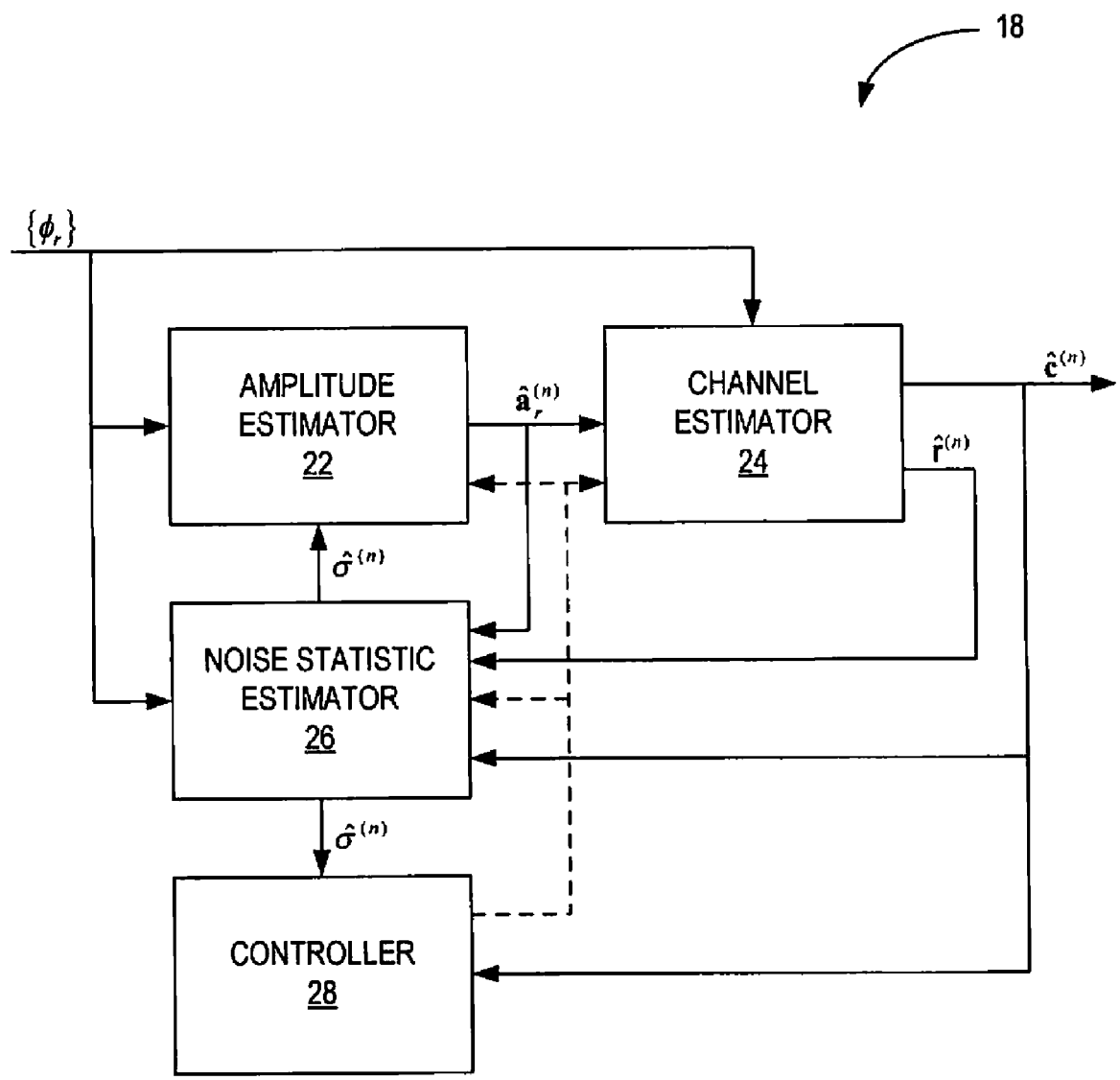
FIG. 3 illustrates an exemplary channel estimation processor for generating channel estimates according to the first embodiment.

FIG. 3 illustrates an exemplary channel processor 18 for generating channel estimates $\hat{c}$ according to the method shown in FIG. 2. The channel processor 18 comprises an amplitude estimator 22, a channel estimator 24, a noise statistic estimator 26, and a controller 28. The amplitude estimator 22 generates amplitude estimates $\hat{a}$ over the length of the training sequence based on the phase samples $\{\phi_r\}$ of the received signal r(n). The amplitude estimator 22 provides the amplitude estimates $\hat{a}$ to channel estimator 24, which combines the amplitude estimates $\hat{a}$ with the phase samples $\{\phi_r\}$ to reconstruct an estimate of the received signal $\hat{r}(n)$ and generate revised channel estimates $\hat{c}$. The noise statistic estimator 26 computes the noise statistic (e.g., the noise standard deviation) based on the channel estimates $\hat{c}$ provided by the channel estimator 24, amplitude estimates $\hat{a}$ from the amplitude estimator 22, and the estimate $\hat{r}(n)$ of the received signal. Controller 28 determines when to stop the iterative process based on the number of iterations performed, or on some predetermined convergence criterion.

Figure 4:
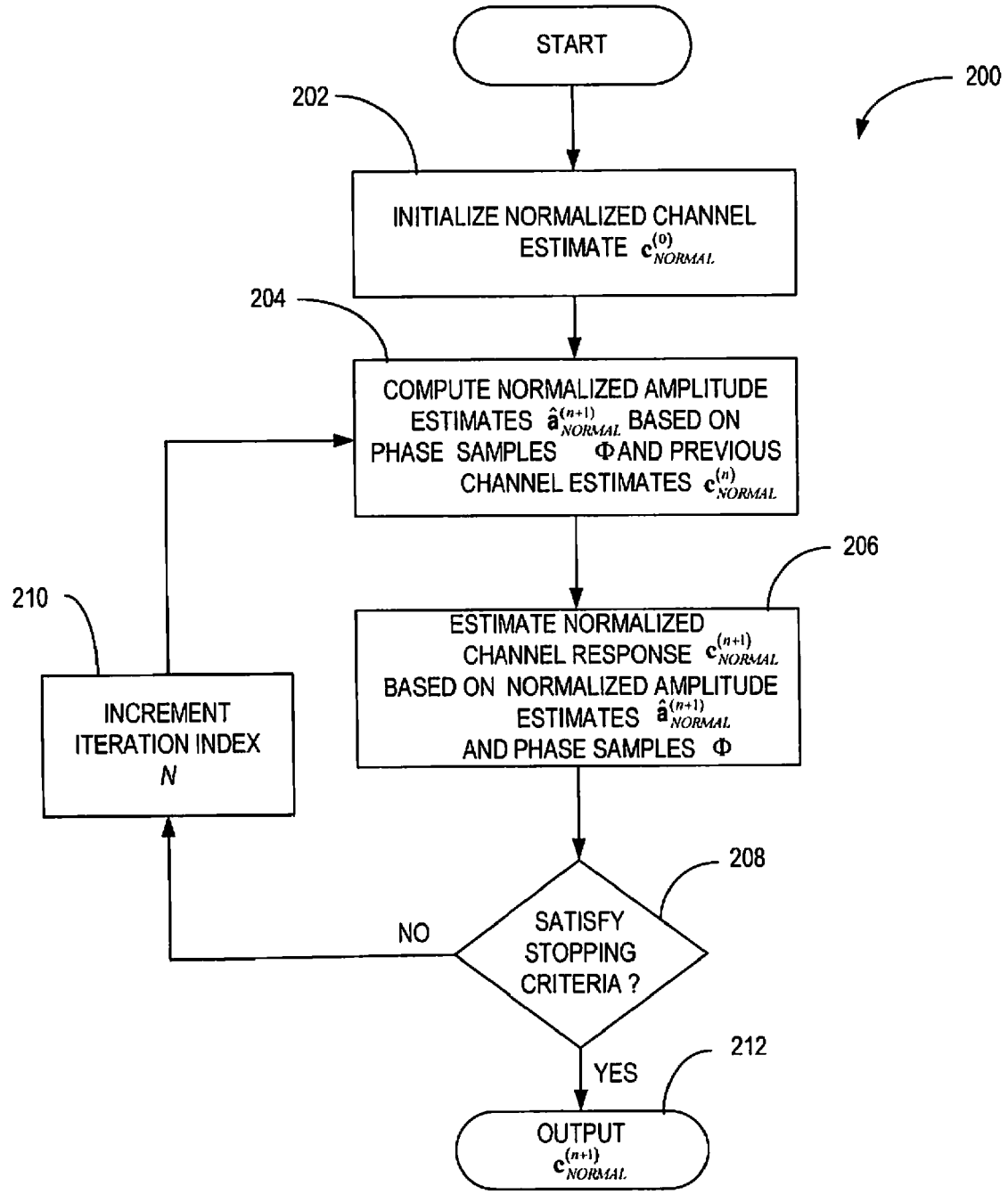
FIG. 4 illustrates an exemplary method for computing channel estimates according to a second embodiment.

The channel estimation method described above may be simplified by setting the noise standard deviation estimate $\hat{\sigma}^{(n)} = 1$ at each iteration. The effect of this simplification yields normalized amplitude and channel estimates denoted respectively by $\hat{a}_{NORMAL}$ and $\hat{c}_{NORMAL}$. FIG. 4 illustrates an exemplary method 200 implemented by the channel processor 18 for computing normalized channel estimates $\hat{c}_{NORMAL}$ according to a second embodiment of the present invention. As in the first embodiment, the receiver front end 12 provides the phase $\phi_r$ of the received signal over the training sequence to the channel processor 18. The channel processor 18 initializes the normalized channel estimate $\hat{c}_{NORMAL}^{(0)}$ (block 202). The initial normalized channel estimate $\hat{c}_{NORMAL}^{(0)}$ may be set arbitrarily as previously described, or another available channel estimate may be used as the initial normalized channel estimate $\hat{c}_{NORMAL}^{(0)}$. Following initialization of the normalized channel estimates $\hat{c}_{NORMAL}$, the channel processor 18 iteratively computes the normalized channel estimates $\hat{c}_{NORMAL}$ based on the phase samples $\{\phi_r\}$ of the received signal (blocks 204-206). During each iteration, channel processor 18 estimates the normalized amplitudes $\hat{a}_{NORMAL}$ of the received signal over the training sequence based on the phase samples $\{\phi_r\}$ and the previous normalized channel estimates $\hat{c}_{NORMAL}^{(n)}$ according to Eq. 13 (block 204). The initial normalized channel estimates $\hat{c}_{NORMAL}^{(0)}$ serve as the previous normalized channel estimates $\hat{c}_{NORMAL}^{(n)}$ for the first iteration. By combining the estimated signal amplitudes $\hat{a}_{NORMAL}$ with the phase samples $\{\phi_r\}$ of the received samples, the channel processor 18 is able to reconstruct an estimate $\hat{r}(n)$ of the received signal. The received signal estimate $\hat{r}(n)$ is then used in a conventional manner to generate revised normalized channel estimates $\hat{c}_{NORMAL}$ (block 206). For example, least square channel estimates may be computed according to Eq. (13) or Eq. (17). Once the updated channel estimate $\hat{c}_{NORMAL}$ is obtained, the channel processor 18 determines whether to continue with another iteration based on some predetermined stop criterion as previously described (block 208). For example, the channel processor 18 may stop after a predetermined maximum number of iterations are reached. Alternatively, the channel processor 18 may stop when the incremental change in the sum of marginal log-likelihood functions is less than a predetermined threshold. If the stop criterion is met, the channel processor 18 outputs the most recent channel estimate generated during the last iteration and stops (block 212). If the stop criteria is not met, the channel estimator increments the index n (block 210) and repeats blocks 204-208.

Figure 5:
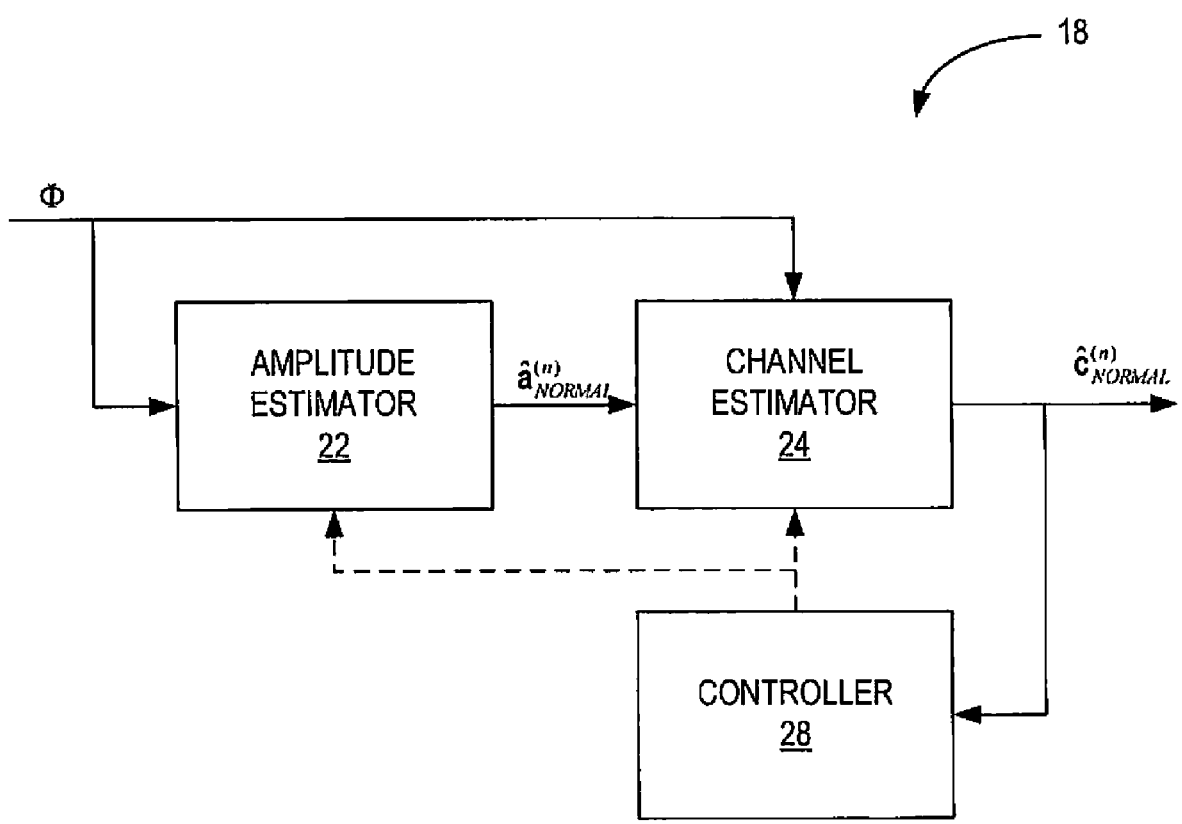
FIG. 5 illustrates an exemplary channel estimation processor for generating channel estimates according to the second embodiment.

FIG. 5 illustrates an exemplary channel processor 18 for generating channel normalized estimates according to the second embodiment shown in FIG. 4. In this embodiment, the noise estimator is not required. The channel processor 18 comprises an amplitude estimator 22, a channel estimator 24, and a controller 28. The amplitude estimator 22 generates normalized amplitude estimates $\hat{a}_{NORMAL}$ over the length of the training sequence based on the phase of the received signal. The amplitude estimator 22 provides the normalized amplitude estimates $\hat{a}_{NORMAL}$ to the channel estimator 24, which combines the normalized amplitude estimates $\hat{a}_{NORMAL}$ with the received phase samples $\{\phi_r\}$ to reconstruct an estimate $\hat{r}(n)$ of the received signal and generate revised normalized channel estimates $\hat{c}_{NORMAL}$. The controller 28 determines when to stop the iterative process based on the number of iterations performed, or on some predetermined convergence criterion.

The present invention allows the receiver 10 to compute an accurate estimate of the channel response using only the phase information of the received signal. The ability to generate accurate channel estimates from only the phase of the received signal enables the receiver 10 to have a hard-limiting front-end which is typically smaller in size, lower in cost, and more energy efficient than a linear front-end. The channel estimation processor 18 is compatible with any training sequence including those designed for receivers that provide both amplitude and phase of the received signal to the baseband processor 14. Hence, the transmitter does not have to alter the transmission format depending upon whether the receiver 10 has a hard-limiting or a linear front-end.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating channel estimates for a received signal that is hard-limited based on phase samples of the received signal, said method comprising:
    computing expected amplitude values for the received signal having hard-limited amplitude values based on the phase samples and previous channel estimates; and
    computing revised channel estimates based on the expected amplitude values and the phase samples.

2. The method of claim 1 wherein the computation of the expected amplitude values for the received signal is based further on a previous noise statistic.

3. The method of claim 1 wherein the expected amplitude values for the received signal and the revised channel estimates are computed iteratively.

4. The method of claim 3 wherein the revised channel estimates computed during each iteration are available as the previous channel estimates for a subsequent iteration.

5. The method of claim 4 wherein the computation of the expected amplitude values for the received signal is based further on a previous noise statistic.

6. The method of claim 5 further comprising computing a revised noise statistic during each iteration, wherein the revised noise statistic computed during each iteration is available as the previous noise statistic for a subsequent iteration.

7. The method of claim 6 wherein computing a revised noise statistic during each iteration comprises computing an expected noise statistic based on the revised channel estimate and a known symbol sequence.

8. The method of claim 1 wherein the revised channel estimates comprise least squares channel estimates.

9. The method of claim 1 wherein the revised channel estimates comprise maximum a postieri (MAP) channel estimates.

10. The method of claim 1 wherein said expected amplitude values and said channel estimates comprise normalized values.

11. A channel estimation processor for generating channel estimates based on the phase of a received signal that is hard-limited, said channel estimation processor comprising:
    an amplitude estimator to generate amplitude estimates for the received signal by computing expected values for the amplitude of the received signal having hard-limited amplitude values based on received phase samples of the received signal and previous channel estimates; and
    a channel estimator to compute revised channel estimates based on the amplitude estimates and the phase samples.

12. The channel estimation processor of claim 11 wherein the amplitude estimator is configured to compute the expected values for the amplitude of the received signal based further on a previous noise standard deviation estimate.

13. The channel estimation processor of claim 11 wherein the amplitude estimator is configured to compute iteratively the expected values for the amplitudes of the received signal and the revised channel estimates.

14. The channel estimation processor of claim 13 wherein the amplitude estimator is configured to use revised channel estimates computed during a prior iteration as the previous channel estimates for a current iteration.

15. The channel estimation processor of claim 13 wherein the amplitude estimator is further configured to compute the expected values for the amplitudes of the received signal based further on a previous noise statistic.

16. The channel estimation processor of claim 15 further comprising a noise estimator to compute a revised noise statistic during each iteration, wherein the revised noise statistic computed during each iteration is available as the previous noise statistic for a subsequent iteration.

17. The channel estimation processor of claim 16 wherein the noise estimator is configured to compute the revised noise statistic by computing an expected noise statistic based on the revised channel estimate and a known symbol sequence.

18. The channel estimation processor of claim 11 wherein the channel estimator is configured to compute revised channel estimates as least squares channel estimates.

19. The channel estimation processor of claim 11 wherein the channel estimator is configured to compute revised channel estimates as maximum a postieri (MAP) channel estimates.

20. The channel estimation processor of claim 11 wherein said amplitude estimates comprise normalized amplitude estimates, and wherein said revised channel estimates comprise normalized channel estimates.

21. A method of generating channel estimates for equalizing a received signal that is hard-limited, said method comprising:
iteratively computing amplitude estimates for a received signal, wherein the amplitude estimates are computed during each iteration based on phase samples of the received signal and previous channel estimates;
computing revised channel estimates during each iteration having hard-limited amplitude values based on the phase samples of the received signal and the computed amplitude estimates; and
outputting the channel estimates derived in a final iteration when a predetermined stop criterion is met.

22. The method of claim 21 wherein computing amplitudes estimates for the received signal comprises computing expected values of the amplitude of the received signal.

23. The method of claim 21 wherein the revised channel estimates computed during each iteration are available as the previous channel estimates for a subsequent iteration.

24. The method of claim 21 wherein the computation of the amplitude estimates for the received signal is based further on a previous noise statistic.

25. The method of claim 24 further comprising computing a revised noise statistic during each iteration, wherein the revised noise statistic computed during each iteration is available as the previous noise statistic for a subsequent iteration.

26. The method of claim 25 wherein computing the revised noise statistic during each iteration comprises computing an expected noise statistic based on the revised channel estimate and a known symbol sequence.

27. The method of claim 21 wherein the revised channel estimates comprise least squares channel estimates.

28. The method of claim 21 wherein the revised channel estimates comprise maximum a postieri (MAP) channel estimates.

29. The method of claim 21 wherein said amplitude estimates comprise normalized amplitude estimates, and wherein said revised channel estimates comprise normalized channel estimates.

* * * * *

UNITED STATES PATENT AND TRADEMARK OFFICE
CERTIFICATE OF CORRECTION

PATENT NO. : 8,379,709 B2  
APPLICATION NO. : 12/204217  
DATED : February 19, 2013  
INVENTOR(S) : Hui et al.

It is certified that error appears in the above-identified patent and that said Letters Patent is hereby corrected as shown below:

In the Specifications:

In Column 3, Line 57, in Equation (8), delete "$e^{\alpha(\phi_r(n),s(n),c\sigma)^2}$" and insert -- $e^{\alpha(\phi_r(n),s(n),c,\sigma)^2}$ --, therefor.

In Column 4, Line 27, delete "$(s_i(n),c,\sigma)$" and insert -- $(s_r(n),c,\sigma)$ --, therefor.

Signed and Sealed this  
Fourth Day of June, 2013

Teresa Stanek Rea  
*Acting Director of the United States Patent and Trademark Office*